United States Patent
Baudisch

(10) Patent No.: US 7,525,511 B2
(45) Date of Patent: Apr. 28, 2009

(54) SYSTEM AND METHOD FOR DETERMINING DISPLAY DIFFERENCES BETWEEN MONITORS ON MULTI-MONITOR COMPUTER SYSTEMS

(75) Inventor: Patrick M Baudisch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 508 days.

(21) Appl. No.: 10/884,537

(22) Filed: Jul. 2, 2004

(65) Prior Publication Data

US 2006/0001593 A1 Jan. 5, 2006

(51) Int. Cl.
*G09G 5/00* (2006.01)

(52) U.S. Cl. .................. 345/1.3; 345/1.1; 345/2.1; 345/2.2; 715/761; 348/353

(58) Field of Classification Search ........... 345/1.1–3.4, 345/698–699; 715/761; 348/383
See application file for complete search history.

(56) References Cited

U.S. PATENT DOCUMENTS

| | | | | |
|---|---|---|---|---|
| 4,746,981 A | * | 5/1988 | Nadan et al. | 348/581 |
| 4,800,376 A | * | 1/1989 | Suga et al. | 345/1.3 |
| 5,828,410 A | * | 10/1998 | Drapeau | 348/383 |
| 5,847,784 A | * | 12/1998 | Finnila et al. | 349/73 |
| 5,923,307 A | * | 7/1999 | Hogle, IV | 345/4 |
| 5,956,000 A | * | 9/1999 | Kreitman et al. | 345/1.3 |
| 6,018,340 A | * | 1/2000 | Butler et al. | 715/764 |
| 6,471,355 B1 | * | 10/2002 | Monson et al. | 353/30 |
| 6,982,682 B1 | * | 1/2006 | Kaulgud et al. | 345/1.1 |
| 2005/0083331 A1 | * | 4/2005 | MacKinlay | 345/473 |
| 2006/0033712 A1 | * | 2/2006 | Baudisch et al. | 345/157 |
| 2006/0038741 A1 | * | 2/2006 | Mori et al. | 345/1.1 |

OTHER PUBLICATIONS

Baudisch, P., et al., "Mouse Ether: Accelerating the Acquisition of Targets Across Multi-Monitor Displays," *Proceedings of the Conference on Human Factors in Computing Systems*, Vienna, Austria, Apr. 24-27, 2004, pp. 1379-1382.

Czerwinski, M., et al., "Women Take a Wider View," *Proceedings of the Conference on Human Factors in Computing Systems*, Minneapolis, Minnesota, Apr. 20-25, 2002, pp. 195-202.

(Continued)

*Primary Examiner*—Richard Hjerpe
*Assistant Examiner*—Jason M Mandeville
(74) *Attorney, Agent, or Firm*—Christensen O'Connor Johnson Kindness PLLC

(57) ABSTRACT

A system and method for determining differences and other conditions on a multi-monitor system is provided. A first line is displayed across two monitors. A user aligns one segment of the line on one monitor with the other segment. A second line is displayed across the monitors, parallel to the first. The user then aligns a segment of the second line with the other segment of the second line. A wedge is displayed across the monitors. The user aligns a portion of the wedge such that the wedge appears as a contiguous wedge partially obscured by the physical separation between monitors. The system then determines the relative physical alignment of the monitors, the relative pixel resolution of the monitors, and the physical separation between the display areas of the monitors. If a monitor is rotated, an additional step to determine the rotation of the rotated monitor is also performed.

18 Claims, 13 Drawing Sheets

OTHER PUBLICATIONS

Grudin, J., "Partitioning Digital Worlds: Focal and Peripheral Awareness in Multiple Monitor Use," *Proceedings of the Conference on Human Factors in Computing Systems*, Seattle, Washington, Mar. 31-Apr. 4, 2001, pp. 458-465.

Tan, D.S. and M. Czerwinski, "Effects of Visual Separation and Physical Discontinuities When Distributing Information Across Multiple Displays," *Proc. Interact '03*, pp. 252-255.

* cited by examiner

SYSTEM AND METHOD FOR DETERMINING DISPLAY DIFFERENCES BETWEEN MONITORS ON MULTI-MONITOR COMPUTER SYSTEMS

FIELD OF THE INVENTION

The present invention relates to computer graphic display systems and more particularly, to a system and method for determining display differences between monitors on multi-monitor computer systems.

BACKGROUND OF THE INVENTION

As computer systems have increased in power and capacity, and particularly as graphic display subsystems increase in power and capacity, it is has become more and more commonplace for computer systems to include more than one display device or monitor. As an example, FIG. 1 illustrates a typical, exemplary multi-monitor computer system 100 including a computer 102, a first monitor 104 (sometimes referred to as the primary monitor), and a second monitor 106.

Multi-monitor computer systems are not exclusive to typical desktop systems, such as the exemplary system 100. Instead, multi-monitor computer systems are found on a variety of computer systems including, but not limited to: notebook or tablet computers; hand-held personal digital assistants (PDAs); multi-user computer systems such as mini- and mainframe computers; and the like. Furthermore, many multi-monitor display systems exist that are not connected to a computer system.

Irrespective of the underlying base computer system, or system in general, each multi-monitor system is faced with a similar issue: how to manage the display of information across multiple monitors. For example, the actual display areas of the multiple monitors are separated by the frames of the monitors as well as the physical separation of the monitors, hereafter referred to as an "occlusion area." Physical alignment of monitors impacts the display of information across multiple monitors. Additionally, multiple monitors attached to the system may not be identical, or even nearly identical. As shown in FIG. 1, monitor 104 and monitor 106 have different physical dimensions. Screen resolution, i.e., the number of pixels displayed on a monitor, and pixel resolution, i.e., the physical size of a pixel, also affect multi-monitor display. All of these differences and conditions contribute to making the display of information on a multi-monitor system a challenge.

The typical approach by which most computer systems "deal" with multi-monitor issues systems is to conceptualize a single, contiguous display surface (referred to hereafter as the "display surface") that encompasses the display areas of all monitors. Thus, to the system, and to any applications that wish to render to the attached display system, there is only one surface on which to write. The computer system's graphics display subsystem is responsible for mapping information written to the display surface to each monitor's display area. Thus, software applications write to a single display surface entirely unaware that some information may be displayed across multiple monitors, and the graphics display subsystem takes care of putting the information onto the appropriate monitor. Unfortunately, this approach fails to recognize or compensate for the differences and conditions that exist among the multiple monitors attached to a computer system. As a result, the display anomalies that arise from failing to compensate for these differences and conditions must be sorted out, when possible, by the user's imagination. The following examples illustrate more clearly these display anomalies.

FIG. 2A is a pictorial diagram illustrating an exemplary display surface 200 upon which a single horizontal line 202 has been drawn. The display surface 200 encompasses two display areas, display area 204 and display area 206, corresponding to two monitors in a multi-monitor system that have the same screen resolution. As can be seen, a software application has rendered line 202 as a continuous, horizontal line on the display surface 200, very likely unaware of any display area regions. Naturally, the expectation is that the line 202 will appear as a continuous, horizontal line to the computer user. However, because no effort is made to identify and compensate for differences between monitors, this is not always the case.

FIG. 2B is a pictorial diagram of the exemplary multi-monitor computer system 100 displaying the horizontal line 202 described above. Display areas 204 and 206 (FIG. 2A) correspond to the display areas of monitors 104 and 106. As can be seen, even when the screen resolution between monitor 104 and 106 is the same, due to differences in the actual physical dimensions of monitors 104-106, the physical alignment of the monitors, and separation of the monitors, line 202 visually appears as two distinct lines, line segment 208 and line segment 210, on the multi-monitor computer system 100. Obviously, unless a user/viewer is aware that a software application was rendering a single line 202, the user/viewer is unlikely to interpret line segments 208 and 210 as segments of line 202.

Another factor contributing to the user's confusion as to whether line segment 208 and line segment 210 are actually portions of line 202 is the fact that line segment 210 appears to be drawn thicker than line segment 208. This is due to differences in pixel resolution. As mentioned above, it is assumed that the monitor 104 and monitor 106 share the same screen resolution, i.e., number of displayed pixels. For example, both monitor 104 and monitor 106 could have a screen resolution of 1280 by 1024, meaning there are 1280 pixels in each row of pixels and that there are 1024 pixels in each column of pixels. However, even though screen resolutions are similar, monitor 104 and monitor 106 are of different physical sizes. Thus, to share screen resolution, the pixel resolution for the monitors must be different. In other words, the pixel resolution, i.e., the size or dimension of each pixel, on monitor 104 is smaller than the pixel resolution on monitor 106. As such, even though line 202 is drawn on the display surface 200 with a constant pixel thickness, the apparent/visual thickness of line segment 208 is thinner than the apparent visual thickness of line segment 210 due to pixel resolution differences.

FIGS. 3A-3C further illustrate another display problem that arises when failing to account for differences and conditions in multi-monitor systems. More particularly, FIG. 3A illustrates the display surface 200 encompassing the display areas 204 and 206 of monitors 104 and 106. Again, it is assumed that the screen resolution for each monitor is the same. On the display surface 200, a software application has rendered two diagonal lines, such that a first portion 302 of the diagonal lines falls in display area 204 and the second portion 304 of the diagonal lines falls in display area 206.

FIG. 3B is a pictorial diagram illustrating the diagonal lines displayed on the display areas of monitor 104 and monitor 106. As can be seen, due to the physical separation of the monitors, the alignment of the monitors, the difference in physical size of the monitors, and the differences in pixel resolution, it is difficult for a user to visualize whether or how the first portion 302 of the diagonal lines aligns with the second portion 304 of the diagonal lines. In fact, due to the failure to compensate for the differences mentioned above, it is far more likely that a user visualizes the first portion 302 and second portion 304 of the two diagonal lines as two portions of three diagonal lines displayed on the display surface 200, such as depicted on the display surface 200 in FIG. 3C.

Accordingly, what is needed, is a system and method to determine the differences between monitors in a multi-monitor computer system so that software applications on the computer system that render to a display surface 200 may compensate for such differences. The present invention addresses these and other issues found in the prior art.

SUMMARY OF THE INVENTION

In accordance with aspects of the present invention, a method for determining display differences and separation between monitors in a multi-monitor display system is presented. A first line is displayed across a first and second monitor. The first line is displayed such that a first segment of the first line is displayed on the first monitor and a second segment of the first line is displayed on the second monitor. One of the two segments of the first line is repositionable perpendicularly to the direction of the first line by a user. The aligned position of the repositionable segment of the first line is obtained after a user has repositioned the repositionable segment of the first line to be visually aligned in the direction of the other segment of the first line. The physical alignment of the second monitor relative to the first monitor is determined according to the difference of the aligned position of the repositionable segment of the first line from its initially displayed position.

In accordance with further aspects of the present invention, a method for determining display differences and separation between monitors in a multi-monitor display system is presented. A first line is displayed across a first and second monitor. The first line is displayed such that a first segment of the first line is displayed on the first monitor and a second segment of the first line is displayed on the second monitor. One of the two segments of the first line is repositionable perpendicularly to the direction of the first line by a user. The aligned position of the repositionable segment of the first line is obtained after a user has repositioned the repositionable segment of the first line to be visually aligned in the direction of the other segment of the first line. The physical alignment of the second monitor relative to the first monitor is determined according to the difference of the aligned position of the repositionable segment of the first line from its initially displayed position. A second line is displayed across the first and second monitors. The second line is displayed parallel to the first line. One of the two segments of the second line is repositionable perpendicularly to the direction of the second line by a user. After a user has repositioned the repositionable segment of the second line to be visually aligned in the direction of the first segment of the second line, the aligned position of the repositionable segment of the second line is obtained. The pixel resolution of the second monitor relative to the pixel resolution of the first monitor is determined according to the difference of the aligned position of the repositionable segment of the second line from its initially displayed position. A wedge is displayed across the first and second monitors. A first segment of the wedge is displayed on the first monitor and a second segment of the wedge is displayed on the second monitor. One of the two segments of the wedge is repositionable by a user. After the user has repositioned the repositionable segment of the wedge to be visually contiguous with the first segment of the wedge, the relocated position of the repositionable segment of the wedge is obtained. The occlusion area between the first and second monitors according to the difference of the relocated position of the repositionable segment from its initially displayed position is then determined.

According to yet further aspects of the present invention, a computer system that determines display differences and separation between multiple monitors on the system is presented. The system comprises a first monitor for displaying information from a computing device, and a computing device, coupled to the first monitor for displaying information. The computing device is configured such that, upon adding a second monitor to the computer system, the computing device displays a first line across the first and second monitors. A first segment of the first line is displayed on the first monitor and a second segment of the first line is displayed on the second monitor, and one of the two segments of the first line is repositionable perpendicularly to the direction of the first line by a user. The computing device obtains the aligned position of the repositionable segment of the first line after the user has repositioned the repositionable segment of the first line to be visually aligned in the direction of the other segment of the first line. The computing device then determines the physical alignment of the second monitor relative to the first monitor according to the difference of the aligned position of the repositionable segment of the first line from its initially displayed position.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
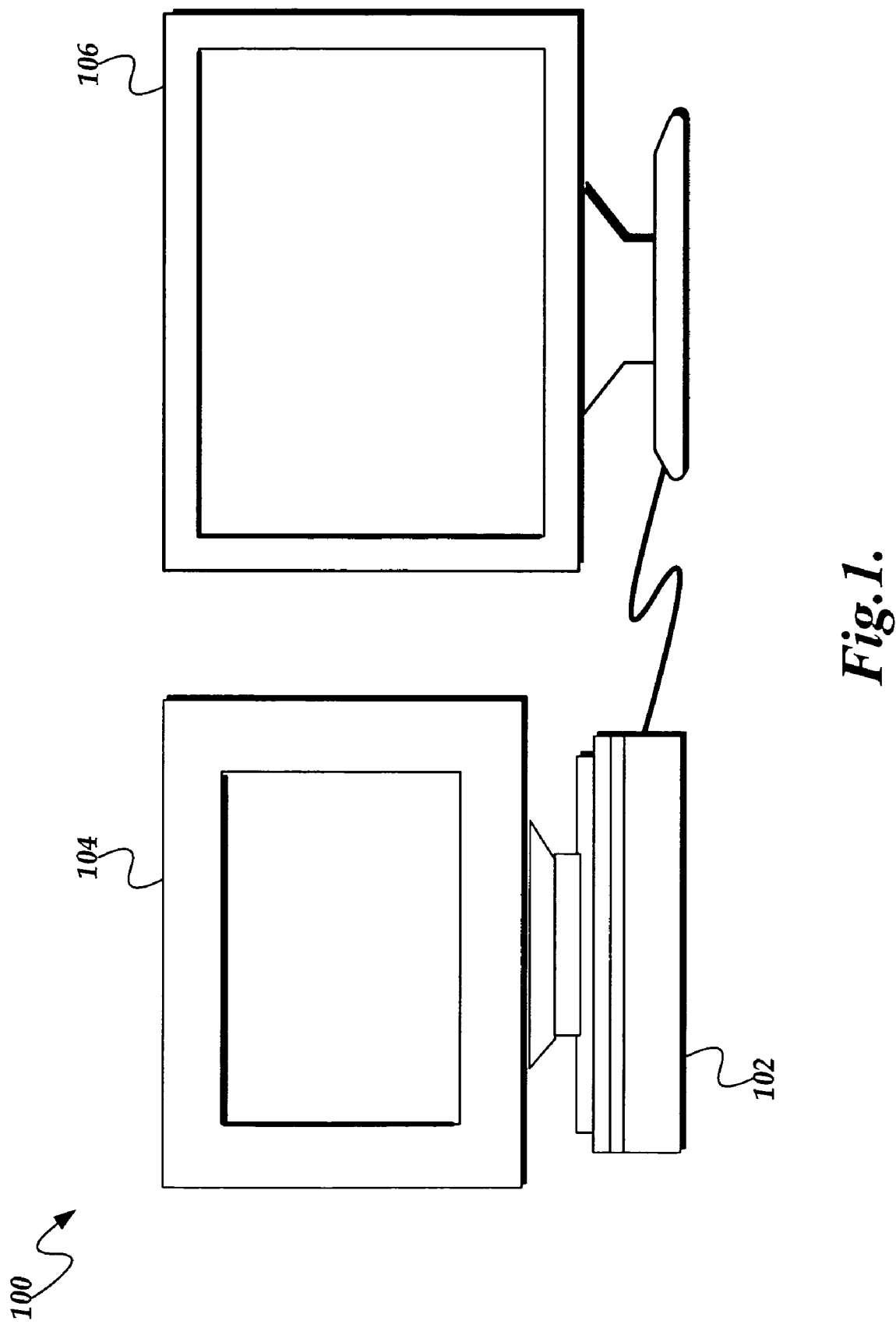
FIG. 1 is a pictorial diagram illustrating an exemplary multi-monitor computer system 100.

While the present invention will be described in terms of the exemplary multi-monitor computer system of FIG. 1, where monitors 104 and 106 are aligned horizontally, it should be appreciated that aspects of the present invention may be similarly applied when monitors are aligned vertically or diagonally. Similarly, while the present invention is described in regard to a multi-monitor computer system having just two monitors, it is for illustration purposes only and should not be construed as limiting upon the present invention. The present invention may be advantageously applied to multi-monitor computer systems having more than two computer monitors. Still further, which the present invention is described as being implemented on a typical desktop computer system connected to multiple monitors, it should be appreciated that the present invention may be advantageously applied to any base system connected to multiple monitors including, but not limited to: laptop computers; tablet computers; PDAs and other handheld computing devices; mini- and mainframe computers; video and media players; as well as other display devices, such as television screens, video walls, and the like.

Those skilled in the art will appreciate that most computer systems have a very simplistic understanding of the relationship between multiple monitors as they form the display surface 200. More particularly, most computer systems connected to multiple monitors know the arrangement, screen resolution, and alignment of display areas as they relate to the display surface 200. For instance, with reference to FIG. 2A, the computer system 100 would know that display area 204 is left of and adjacent to display area 206 (arrangement), that the display areas are aligned along the top of their display areas (alignment), and that the display areas share the same screen resolution. Alignment, arrangement, and sometimes screen resolution, are usually established by a user with respect to the display surface 200. In spite of this "known" information, there are many differences which affect the visual display of information across multiple monitors, as illustrated above.

Figure 4A:
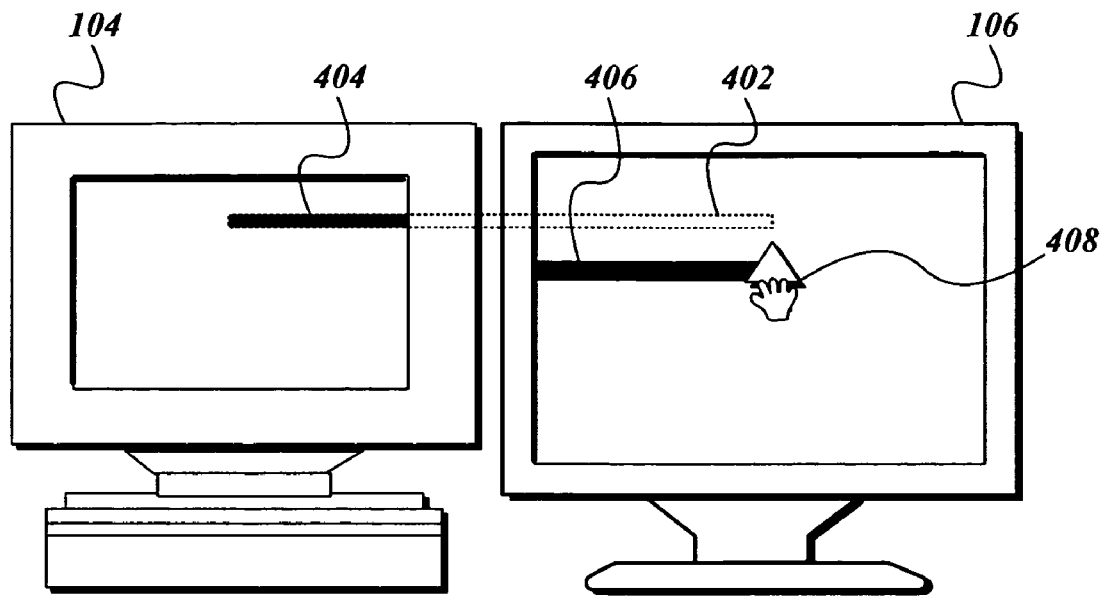
FIGS. 4A and 4B are pictorial diagrams of the exemplary multi-monitor computer system of FIG. 1 illustrating one step in determining display differences between monitors in a multi-monitor computer system.
Figure 4B:
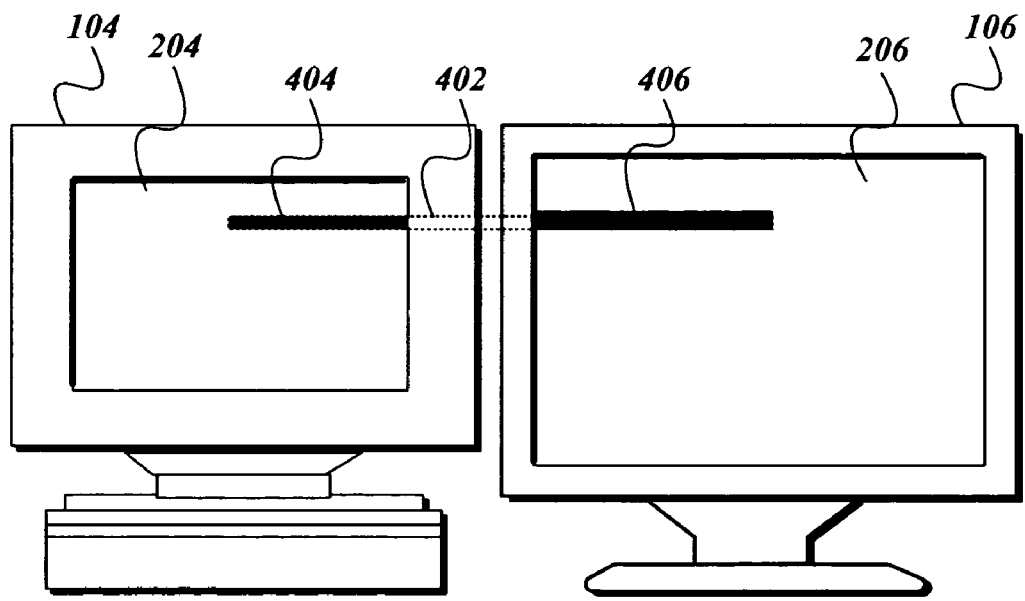

In order to properly compensate for display differences between monitors in a multi-monitor computer system, those differences and conditions must be identified and, at least temporarily, stored for later use. FIGS. 4A and 4B are pictorial diagrams of the exemplary multi-monitor computer system 100 of FIG. 1 illustrating one step of the present invention for determining display differences between monitors 104 and 106 in the computer system. More particularly, as a first step to determining differences between monitors in a multi-monitor computer system, a single line is displayed such that it falls in both the display area of monitor 104 and the display area of monitor 106. With regard to FIG. 4A, a horizontal line is rendered on the underlying display surface 200 of monitors 104 and 106, as represented by the dashed line 402. As previously discussed, the horizontal line appears to be displayed on monitors 104 and 106 as two separate line segments, line segment 404 and line segment 406.

In accordance with the present invention, one of the line segments, such as line segment 406, can be repositioned by the user. Further, according to one aspect of the present invention, in addition to displaying the horizontal line, a reposition icon 408 is displayed on the monitor with the repositionable line segment 406. Using the reposition icon 408, the user then interacts with the repositionable line segment, in this case line segment 406, to reposition the repositionable line segment 406 such that it visually appears aligned with the other line segment 402 on the other monitor 104. FIG. 4B illustrates the results of repositioning line segment 406 to visually align with line segment 404. Ideally, the axis of the repositionable line segment 406 should align with the axis of the other line segment 404.

Once the user has visually aligned the two line segments, the system obtains the repositioned location of line segment 406. Based on the difference between the original and repositioned coordinates of line segment 406, the system determines a physical alignment between monitors 104 and 106. Those skilled in the art will recognize that this physical alignment is different than the display area alignment on the internal display surface discussed above. In particular, even though display area 204 is aligned with display area 206 for purposes of the display surface 200, FIG. 4B illustrates that the display area 204 of monitor 104 is not physically aligned with the display area 206 of monitor 106.

Figure 5A:
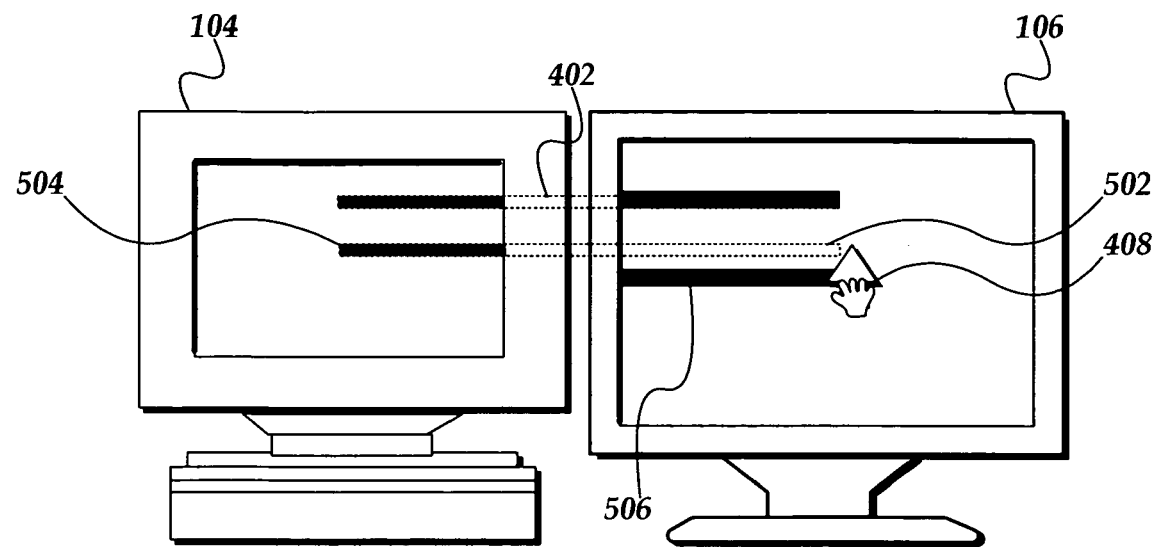
FIGS. 5A and 5B are pictorial diagrams of the exemplary multi-monitor computer system of FIG. 1 illustrating another step in determining display differences between monitors in a multi-monitor computer system.

After having determined a physical alignment between monitors 104 and 106, and leaving the visually aligned horizontal line 402 displayed on the two monitors 104 and 106, the system now moves to determine the difference in pixel resolution between monitors 104 and 106. As illustrated in FIG. 5A, the system accomplishes this by displaying a second line across monitors 104 and 106, parallel to the first line 402. Because the system has only determined a relative physical alignment between monitors 104 and 106, but has not yet determined the relative pixel resolution of the monitors, line 502 frequently also appears as two separate line segments, line segment 504 and line segment 506, when displayed across monitor 104 and monitor 106.

Figure 5B:
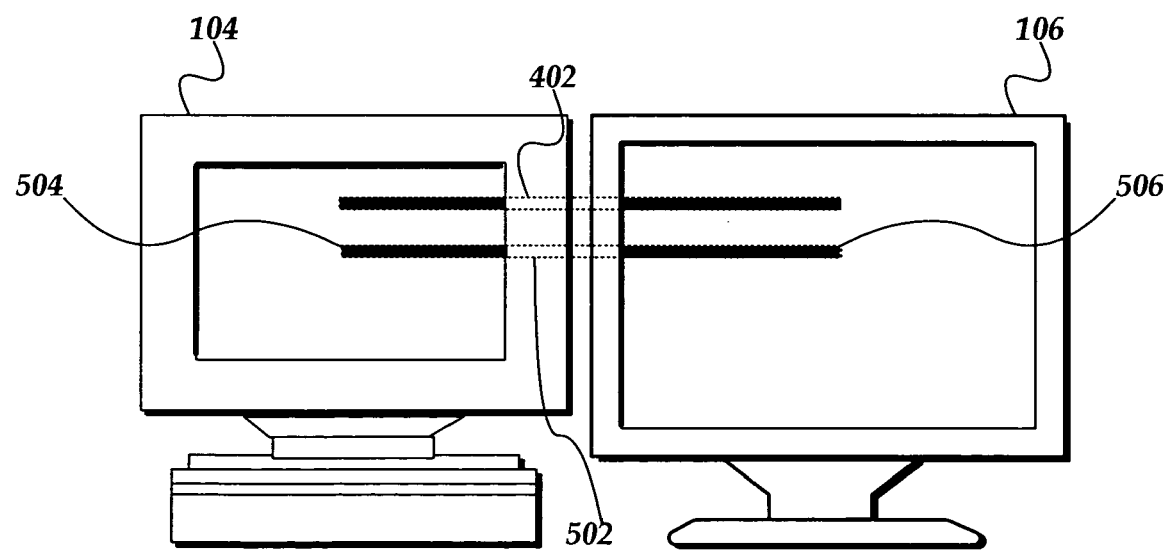

Just as with line 402 described above in regard to FIG. 4, one of the line segments of line 502 can be repositioned by the user. In this example, line segment 506 is repositionable. Additionally, the system again displays the reposition icon 408 for moving line segment 506. After displaying the second line 502 and the reposition icon 408, the user aligns line segment 506 such that its axis is visually aligned with the axis of line segment 504, as illustrated in FIG. 5B.

After the user has aligned line segment 506 with line segment 504, the system obtains the difference of the displayed and repositioned coordinates. With this information, and in combination with the information previously "known" by the system about the arrangement and size of the display areas on the display surface 200, and the previously determined physical alignment, the system can determine the pixel resolution of the second monitor 106 relative to the first monitor 104.

One of the benefits of determining the pixel resolution of the second monitor 106 is that the apparent disparity in line thickness of between the two monitors can be addressed. For example, if the pixel resolution on monitor 106 is twice the thickness of the pixel resolution on monitor 104, when displaying a line 2 pixels in thickness on monitor 104, the line could be continued on monitor 106 with an apparent thickness of 2 pixels, thereby compensating for the differences such that the lines maintain a constant thickness across both monitors. As shown in FIG. 5A, prior to aligning line segment 506 with line segment 504, line segment 506 appears substantially thicker than line segment 504, but in FIG. 5B, after aligning line segment 506 with line segment 504, both line segments are displayed with the same thickness. According to one embodiment, the line thickness of line 506 is modified as the user repositions/aligns line segment 506 with line segment 504.

Figure 2A:
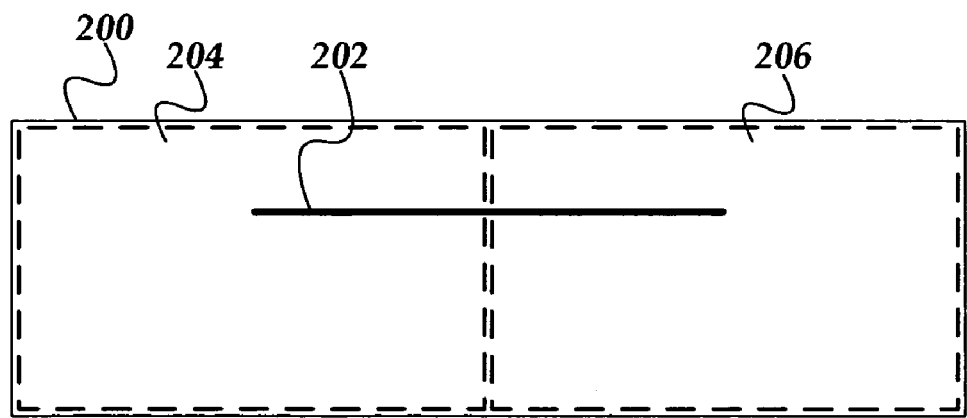
FIG. 2A is a pictorial diagram illustrating an exemplary display surface upon which a single horizontal line has been rendered.
Figure 2B:
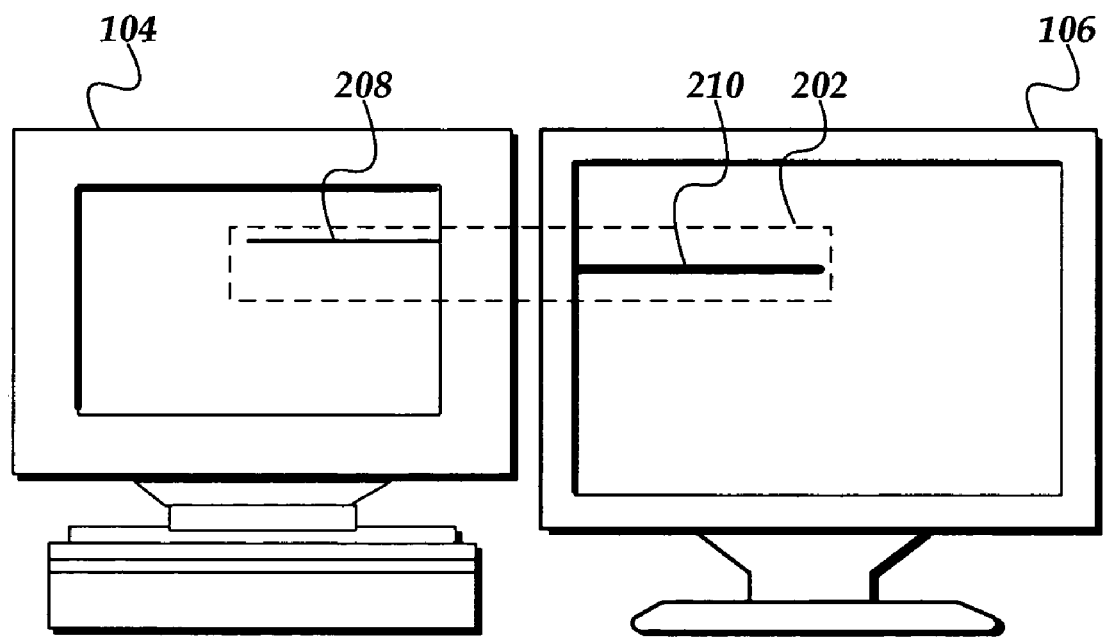
FIG. 2B is a pictorial diagram of the exemplary multi-monitor computer system of FIG. 1 and displaying the horizontal line of FIG. 2A.

After having determined the alignment of monitor 106 relative to monitor 104, and after having determined the pixel resolution of monitor 106 relative to monitor 104, the system proceeds with determining the physical separation between the monitors, or more precisely, the physical separation of display areas. As discussed above, when another monitor is added to the computer system, most systems internally treat the second monitor as contiguous to the first monitor. In other words, as shown in FIG. 2A with respect to the display surface 200, there is no "gap" between the display area 202 of monitor 104 and the display area 206 of monitor 106. However, as those skilled in the art will appreciate, nearly every monitor is encased in some type of frame, and the frames of monitors 104 and 106 create a physical separation between the display areas of those monitors. Additionally, any actual physical separation between monitors 104 and 106 further increases the separation between the display areas 204 and 206.

Figure 3A:
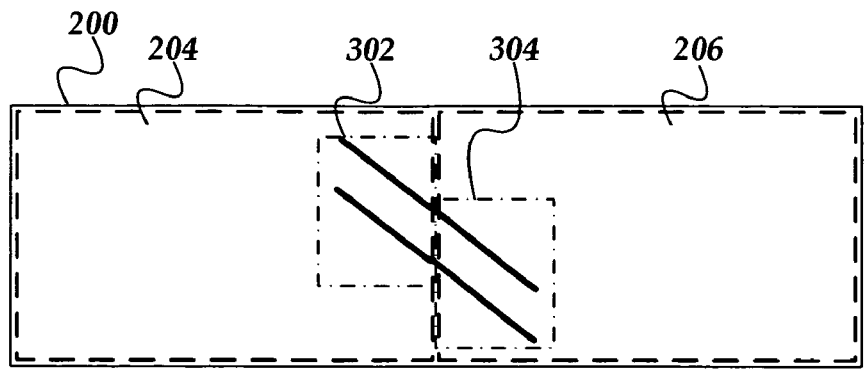
FIG. 3A is a pictorial diagram illustrating the exemplary display surface of FIG. 2 upon which two diagonal lines have been rendered.
Figure 3B:
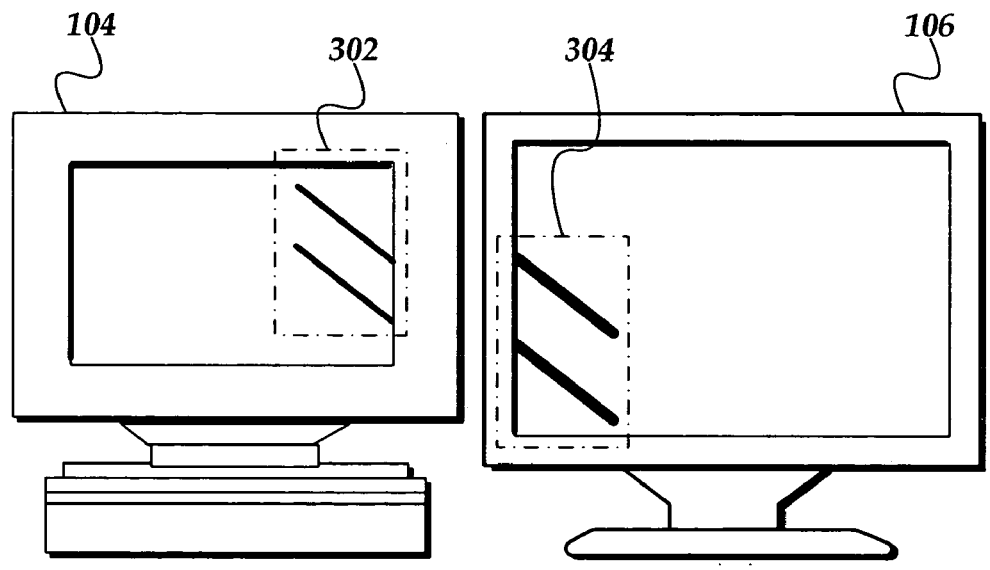
FIG. 3B is a pictorial diagram of the exemplary multi-monitor computer system of FIG. 1 and displaying the two diagonal lines of FIG. 3A.
Figure 3C:
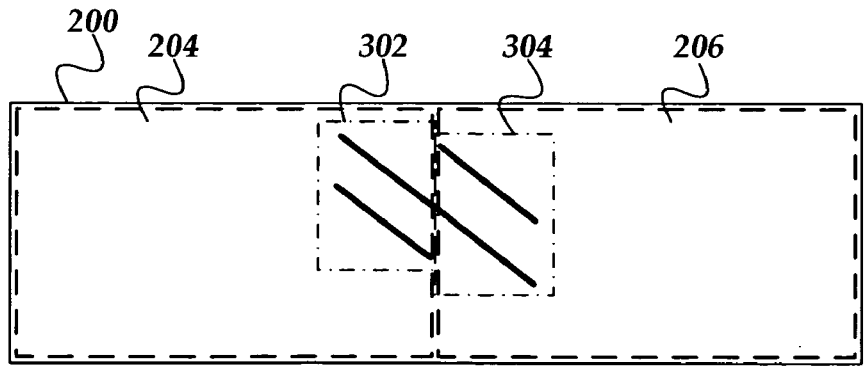
FIG. 3C is a pictorial diagram illustrating the typical user perception of the diagonal lines as shown in FIG. 3B.
Figure 6A:
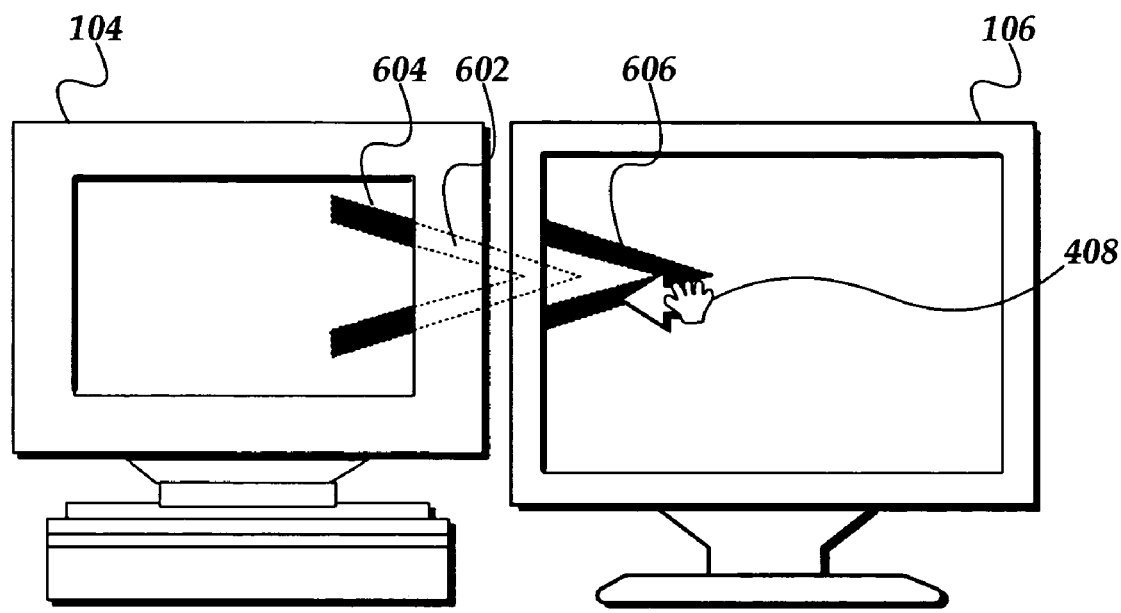
FIGS. 6A and 6B are pictorial diagrams of the exemplary multi-monitor computer system of FIG. 1 illustrating yet another step in determining display differences between monitors in a multi-monitor computer system.

As discussed above in regard to FIGS. 3A, 3B, and 3C, the physical separation between two or more monitors, and in particular the display areas of the monitors, often leads the user to misinterpret the information displayed across multiple monitors. Thus, with reference to FIGS. 6A and 6B, to compensate for the physical separation between the display areas of monitors 104 and 106, the system displays a wedge or triangle across the two monitors. As can be seen in FIG. 6A, the wedge 602 has a portion 604 displayed on monitor 104 and a portion 606 displayed on monitor 106. As with the horizontal lines described above, for illustration purposes the wedge 602 is displayed in part with dashed lines to show how it would appear if it were displayed on a solid, contiguous display area.

According to aspects of the present invention, one portion of the wedge 602 can be repositioned. As shown in FIG. 6A, the second portion 606, displayed on the second monitor 106, is repositionable. Also shown in FIG. 6A is the reposition icon 408 for assisting the user to reposition the second portion 606 of the wedge 602. In this instance, the user repositions a portion 606 of the wedge 602 towards the other portion 604 of the wedge until the wedge appears visually as a contiguous wedge, as displayed in FIG. 6B. Any part of the repositionable portion 606 of the wedge 602 "pushed" off the second monitor 106 remains undisplayed. Thus, when the user has repositioned the wedge 602 to appear visually contiguous, a substantial portion of the wedge 602 is hidden, or occluded, by the separation of the display areas, both in terms of the physical separation of monitors 104 and 106, as well as the frames surrounding the display areas of the monitors.

After the user has repositioned the second portion 606 of the wedge 602 to make the wedge appear contiguous, the system obtains the difference between the initially displayed coordinates of the wedge and the repositioned coordinates. With this difference, the system is able to determine the relative dimensions of the occlusion area, i.e., the physical separation of the display areas.

Figure 6B:
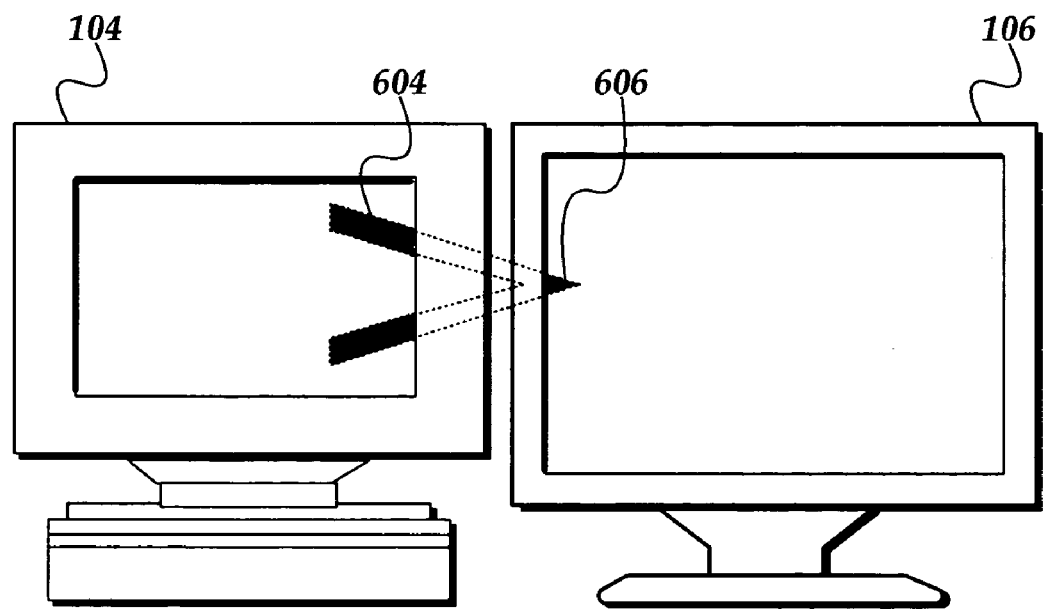

While the examples of FIGS. 6A and 6B describe displaying/using a wedge to determine the occlusion area between the display areas of monitors 104 and 106, it is for illustration purposes only, and should not be construed as limiting upon the present invention. Any number of shapes may be used to determine the occlusion area between monitors, such as ellipses, triangles, polygons, and the like. A wedge or triangle is preferably used due to the ease with which a user can visualize when the wedge appears contiguous.

Figure 7A:
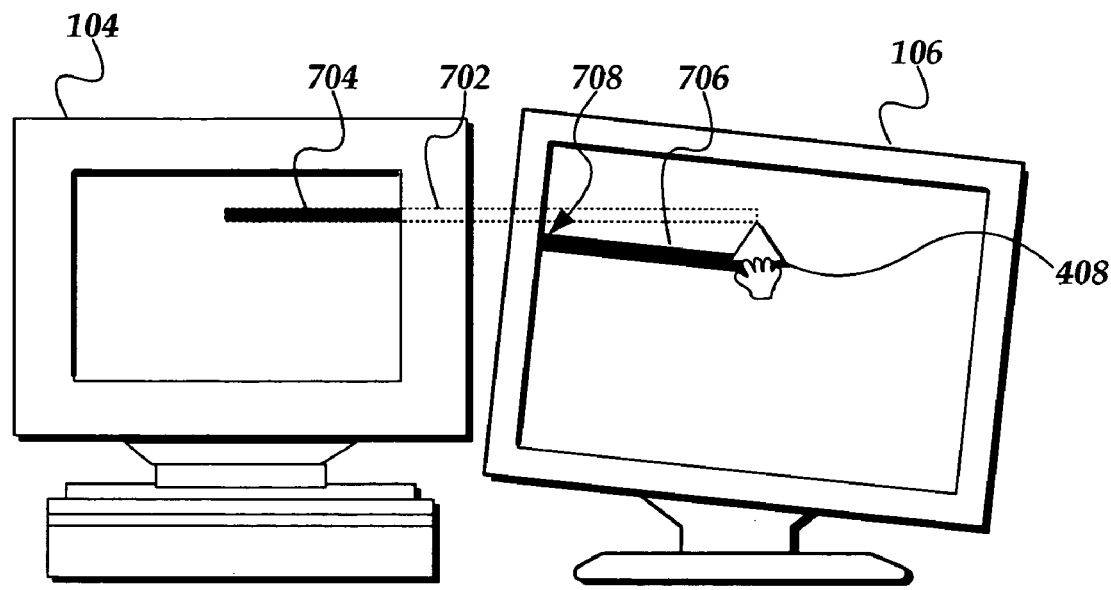
FIGS. 7A and 7B are pictorial diagrams of the exemplary multi-monitor computer system of FIG. 1 illustrating still another step in determining display differences between monitors in a multi-monitor computer system.

As those skilled in the art will appreciate, in some circumstances a second monitor 106 may be rotated with regard to the first monitor 104. For instance, some monitors may actually permit a user to rotate the monitor, while others may simply be placed on a non-level surface. FIG. 7A illustrates the exemplary multi-monitor computer system 100 with monitor 106 slightly rotated in regard to monitor 104. Assuming that none of the previous steps to determine the display differences between the two monitors 104 and 106 have yet been processed, a single horizontal line 702 displayed across monitors 104 and 106 appears as two separate line segments 704 and 706. Additionally, because the line 702 was displayed horizontally and because the monitor 106 is rotated, line segment 706 mirrors the rotation of monitor 106, and a user is less likely to interpret the two line segments as a part of a single line 702.

When a monitor is rotated, it is often preferable to first determine the relative rotation between monitors and compensate for that rotation before attempting to identify other differences, such as those discussed above in regard to FIGS. 4A-4B, 5A-5B, and 6A-6B. The reason for this is that in order to align the axis of line segments, it is easier to align the line segments if the user does not have to factor in a monitor's rotation.

Figure 7B:
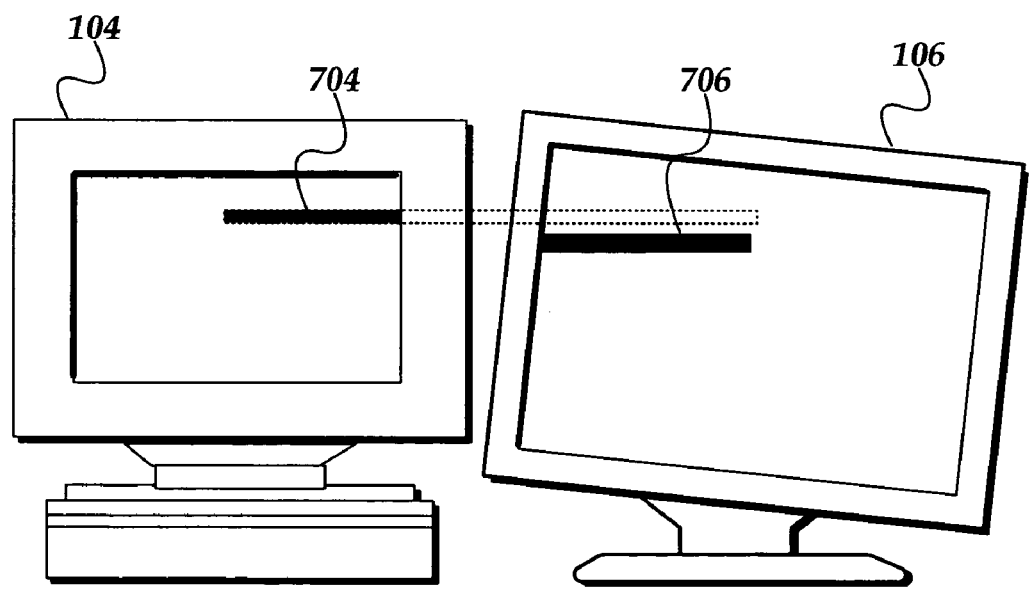

In order to determine the rotation of the second monitor 106 to the first monitor 104, a line 702 is displayed across the two monitors. As with the other steps described above, one of the line segments is repositionable. In this case, segment 706 is repositionable. In addition to displaying the line 702, the reposition icon 408 is displayed. However, in contrast to the previously described steps, the line segment can only be rotated around the anchor point 708. The user then rotates line segment 706 until line segment 706 is parallel with line segment 704, i.e., the axis of line segment 706 is parallel to the axis of line segment 704, as shown in FIG. 7B.

After the user has rotated line segment 706 to be parallel to line segment 704, the system obtains the rotation amount and uses it to determine the relative rotation of monitor 106 to monitor 104.

While it may be preferable to determine the relative rotation of monitor 106 to monitor 104 prior to performing other described steps, it is not essential to determine the rotation as the first step. For example, if monitor 106 were rotated as illustrated in FIG. 7A, aligning the line segments 704 and 706 (as described above in regard to FIGS. 4A-4C) would entail repositioning line segment 706 such that anchor point 708 is positioned on the axis of line segment 704, all without changing the rotation of line segment 706.

While the system and methods described above have been made in the context of multiple monitors aligned horizontally, it is for illustration purposes only and should not be construed as limiting upon the present invention. According to one aspect of the present invention, the present invention may also be applied to multiple monitors aligned in any orientation. For example, if two monitors are aligned vertically (as to the display surface), rather than using horizontal lines across the two monitors, vertical lines are used. Similarly, when two monitors are aligned diagonally (as to the display surface), diagonal lines could be used.

Additionally, the above-described system and methods have been described in terms of determining the differences between two monitors. This, too, has been for illustration purposes only and should not be construed as limiting upon the present invention. It is more and more frequent that a system may include three or more monitors. In order to identify the differences among all monitors, the system simply picks a first monitor (possibly the primary monitor) and determines the differences between it and one other monitor. Once those differences are identified, differences between another monitor and one of the first two processed monitors is identified. This process continues until differences between all monitors have been identified.

Figure 8:
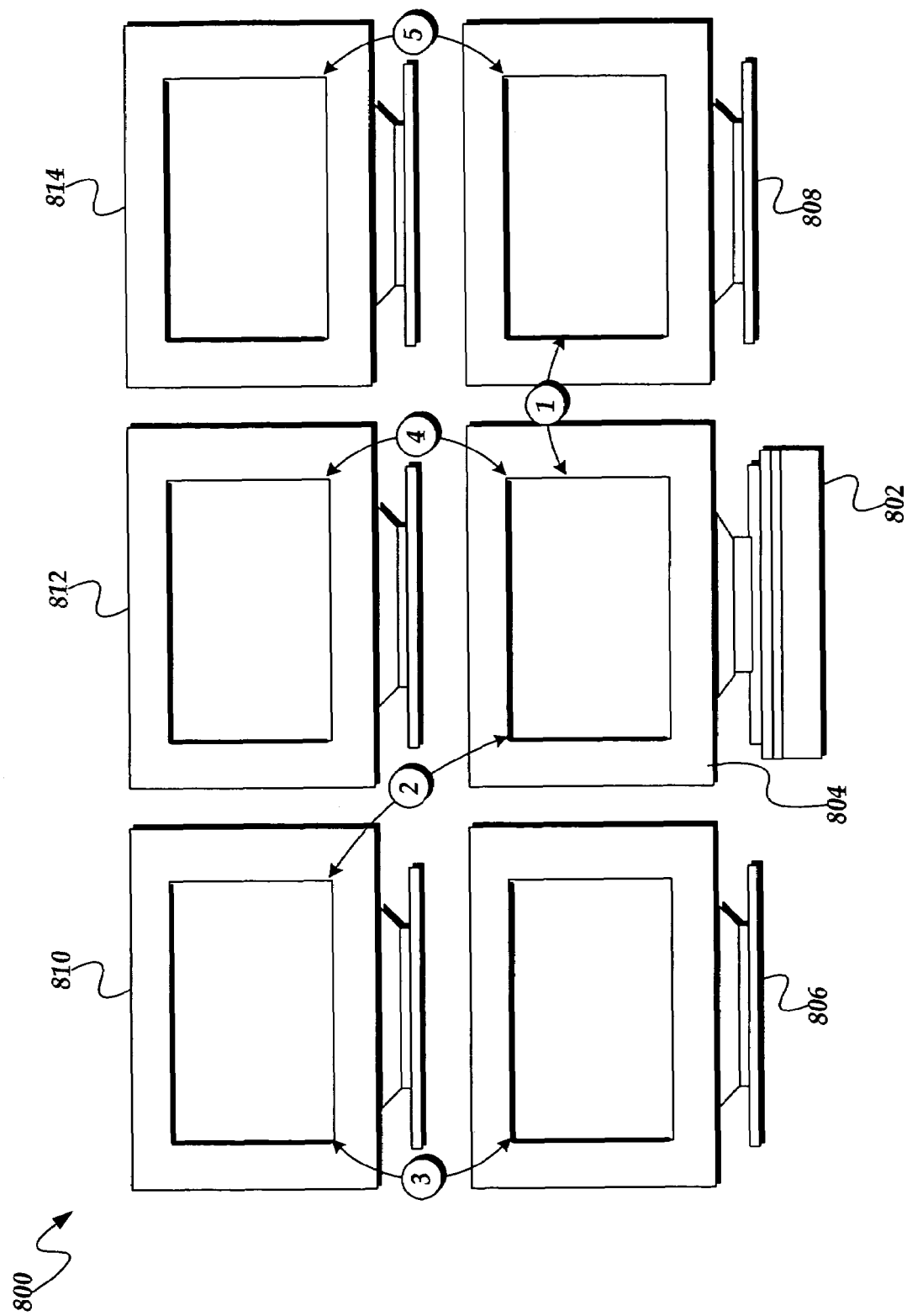
FIG. 8 is a pictorial diagram of an exemplary multi-monitor computer system suitable for illustrating the order in which differences between display monitors can be identified.

To better illustrate identifying differences among more than two monitors, FIG. 8 is a pictorial diagram of an exemplary multi-monitor computer system 800 suitable for illustrating an order in which differences among display monitors can be identified. A first monitor must be chosen. Any monitor may be chosen as a first monitor, but for this example, as monitor 804 is connected to the computer 802, it is selected as the first monitor. Consistent with the descriptions of FIGS. 4A-4B, 5A-5B, 6A-6B, and 7A-7B, monitor 808 is chosen as the second monitor, and the system determines the differences between the monitors, as indicated by circle 1. In this first case, both monitors 804 and 808 have been processed.

After processing monitors 804 and 808, the system selects an unprocessed monitor for processing with respect to a processed monitor, as indicated by circle 2. For this example, the system selects monitor 810 for processing against monitor 804, and determines the display differences between the two monitors, especially monitor 810 relative to monitor 804. As these monitors are positioned diagonally, the lines displayed across the monitors would be diagonal lines rather than horizontal lines.

As monitor 810 has been processed, it may now be used to further process other monitors in the system. Thus, as shown by circle 3 in FIG. 8, monitor 806 is processed against monitor 810. Additionally, monitor 812 is processed with reference to monitor 804, as indicated by circle 4, and monitor 814 is processed with reference to monitor 808, as indicated by circle 5. In this manner, i.e., processing a first two monitors and, thereafter, processing an unprocessed monitor to an adjacent processed monitor, the system can identify and store the display differences among all monitors so that information presented on the monitors in a multi-monitor computer system can be displayed as a visually integrated single display area.

Figure 9A:
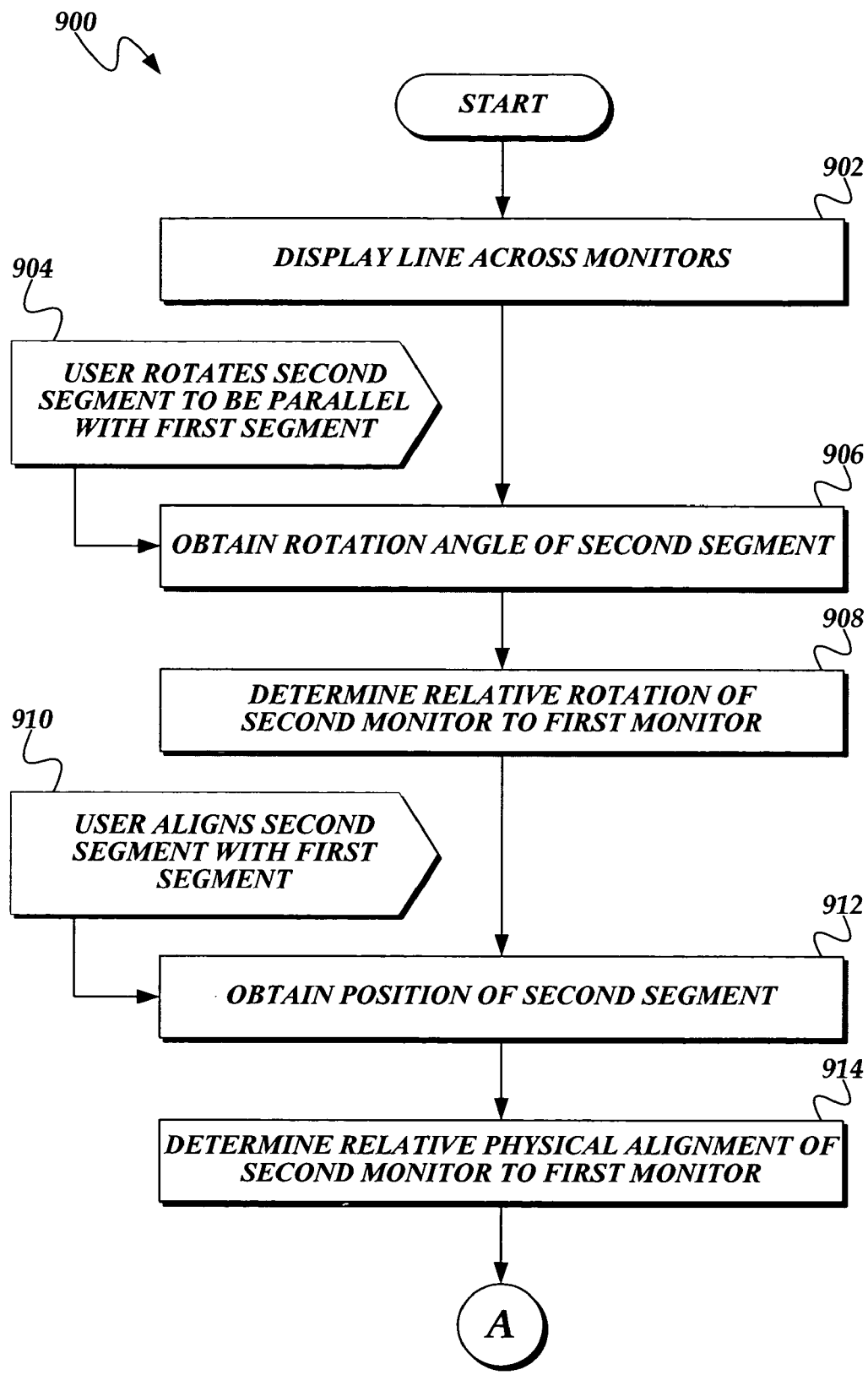
FIGS. 9A, 9B, and 9C illustrate a flow diagram of an exemplary routine for determining display differences between monitors in a multi-monitor computer system.
Figure 9B:
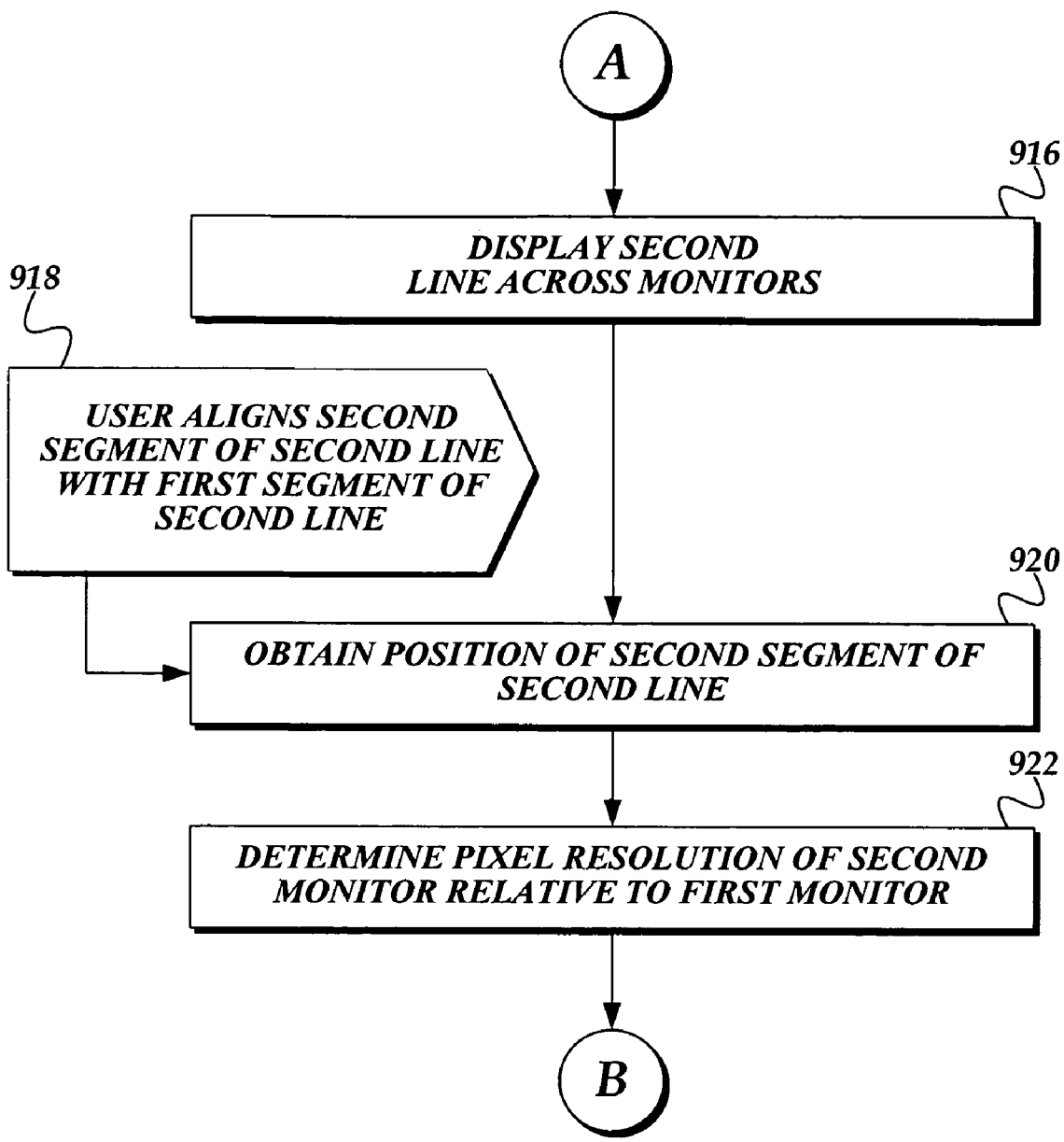
Figure 9C:
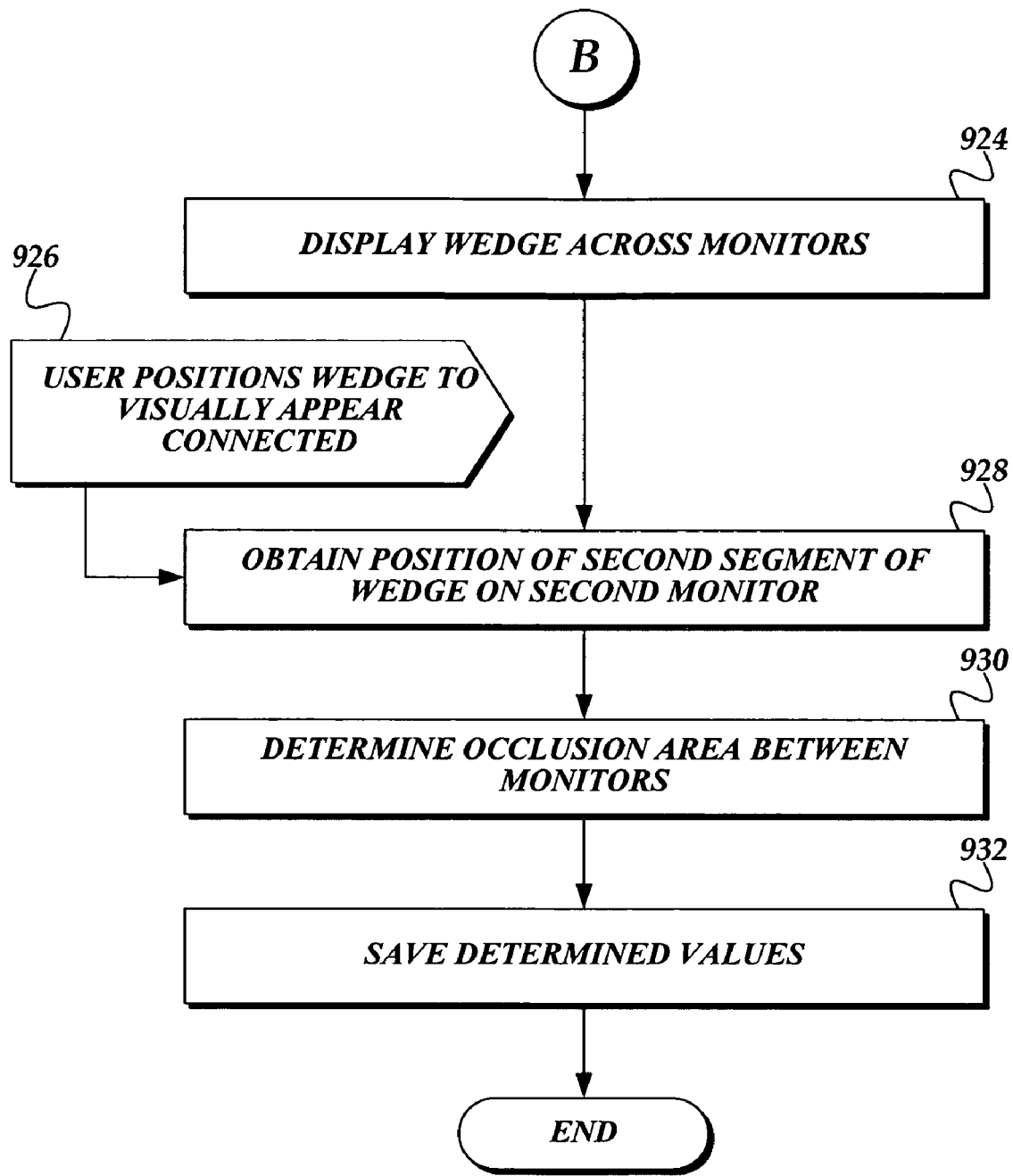

FIGS. 9A-9C illustrate a flow diagram of an exemplary routine 900 for determining display differences between monitors in a multi-monitor computer system 100. Beginning at block 902, a line is displayed across two monitors, monitors 104 and 106, in the multi-monitor computer system 100. At event 904, after the line is displayed across the monitors, a user then rotates a rotatable segment of the line on a second monitor, such as monitor 106 of FIG. 7, around an anchor point in order to align the axis of the rotatable segment to be parallel with the axis of the first segment of the line on the first monitor. At block 906, after the user has rotated the rotatable line segment to be parallel with the first segment of the line, the system obtains the rotation angle of the rotated line segment from its original, displayed position. Using this rotation angle, at block 908, the relative rotation of the second monitor 106 to the first monitor 104 is determined.

According to aspects of the present invention, because purposefully rotating a monitor may be relatively rare, determining the rotation of monitor 106 to monitor 104 should be viewed as optional, and the above-described steps taken to determine the rotation may be omitted when an assumption can be made that one monitor is not rotated. However, in the event that determining the rotation of monitor 106 to monitor 104 is deemed unnecessary, a line must still be displayed across to the two monitors to continue with determining the relative alignment of monitors, as described below.

With a line displayed across the monitors 104 and 106 (and with the line segments of that line parallel to each other in the event that rotational correction was performed), at event 910, the user aligns the axis of the repositionable line segment, such as line segment 406, on monitor 106 with the axis of the line segment, such as line segment 404, on monitor 104. At block 912, after the user has aligned the repositionable line segment on monitor 106 with the corresponding line segment on monitor 104, the user-modified position of the repositionable line segment is obtained. At block 914, using the user-modified position of the repositionable line segment, the relative physical alignment of the second monitor 106 to the first monitor 104 is determined.

At block 916, a second line, parallel to the first line, is displayed across monitors 104 and 106. Thereafter, at event 918, the user aligns a repositionable line segment of the second line, such as line segment 506 (FIG. 5), with the first segment of the second line on monitor 104. After the user has aligned the repositionable line segment with the corresponding line segment on the other monitor, at block 920, the new position of the repositionable line segment is obtained. At block 922, based on the difference between the initially displayed position and the user-located position of the repositionable line segment, the pixel resolution of the second monitor, relative to the first monitor, is determined.

At block 924, the screen is cleared and a wedge is displayed across both monitors. At event 926, the user repositions a repositionable portion of the wedge, such as portion 606 (FIG. 6), such that the wedge appears to be visually contiguous in relation to the corresponding portion on the other monitor. At block 928, the position of the repositionable portion of the wedge is obtained. At block 930, based on the displayed position and the user-located position of the repositionable portion of the wedge, the system determines the occluded area between the monitors. After having determined various values of factors that affect the visual display of information across multiple monitors, at block 932, the determined values are saved, and the routine 900 terminates.

According to aspects of the present invention, the determined values and information are preferably stored in a location that is accessible to all software applications. For example, the determined values may be stored in a registry area provided by, or associated with, the host operating system. In one embodiment, the operating system executes the exemplary method 900 as part of a setup procedure when additional monitors are added to the system.

According to one embodiment of the present invention, the process for determining the differences between monitors as well as the physical arrangement of monitors in a multi-monitor computer system may be implemented as a so-called "wizard" that walks the computer user through identifiable, separate steps. However, according to alternative aspects of the present invention, any or all of the separate steps may be combined together. For example, rather than displaying a first line across two monitors and aligning the first line before a second line is displayed, two lines could be displayed, and the user simply aligns both lines on the same screen. Clearly, determining rotational differences could be combined with the display of two lines as easily as one. Additionally, determining the physical separation of display areas could be combined with the display of two lines. For example, a separate wedge could be displayed in addition to the two lines.

Figure 10A:
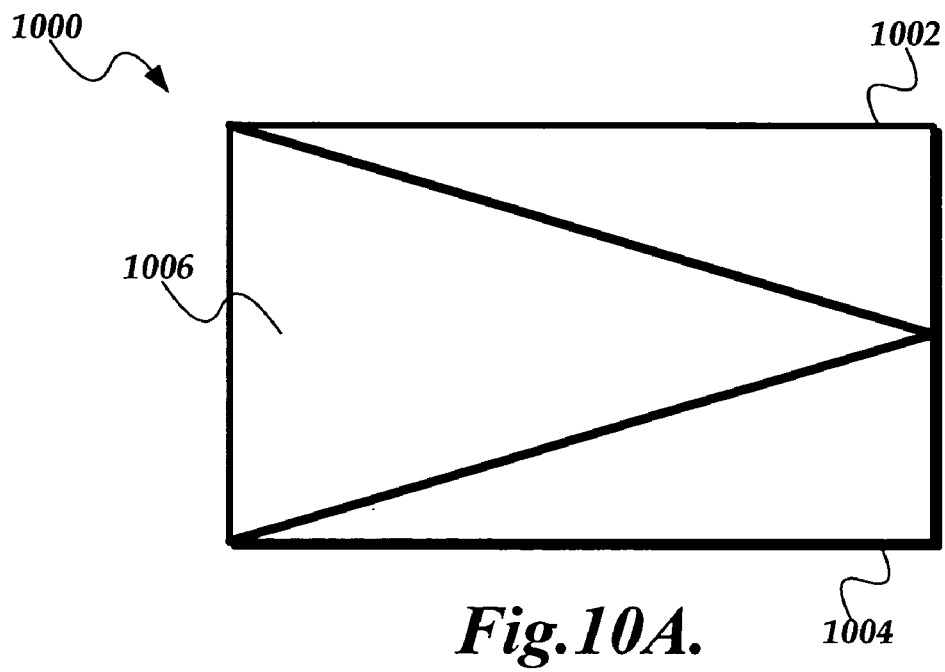
FIG. 10A is a pictorial diagram illustrating an exemplary image that may be used when determining differences and conditions between monitors in a multi-monitor computer system in a "single screen" process.
Figure 10B:
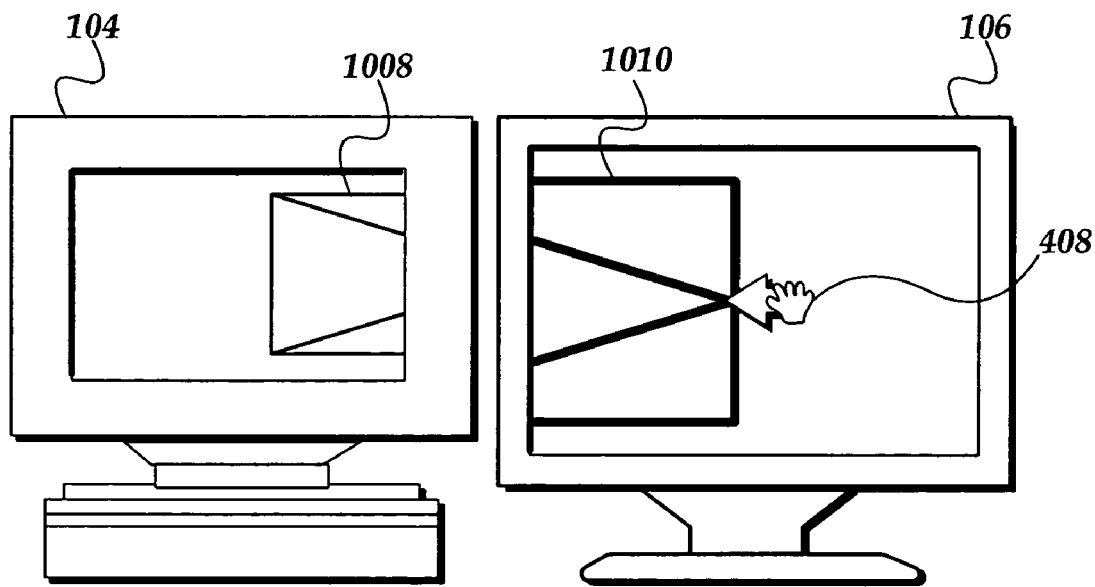
FIG. 10B is a pictorial diagram illustrating the exemplary image of FIG. 10A displayed on the exemplary multi-monitor computer system in a single screen process.

FIG. 10A is a pictorial diagram illustrating an exemplary image 1000 that may be used when determining differences and conditions between monitors in a multi-monitor computer system in a "single screen" process. As illustrated in FIG. 10A, the image 1000 is a rectangle with a triangle 1006 inside. The rectangle 1000 has two lines that would be displayed across two monitors, the top line 1002, and the bottom line 1004. FIG. 10B is a pictorial diagram illustrating the exemplary image 1000 displayed on the exemplary multi-monitor computer system 100 for single screen setup. As can be seen, the image 1000 appears as two separate segments, segments 1008 and 1010. Consistent with the processes described above, one of the segments would be repositionable, such that a user would adjust the lines 1002 and 1004 such that they were visually aligned, and reposition the repositionable segment such that the triangle visually appeared contiguous, though obscured by the occlusion area.

Those skilled in the art will appreciate that any number of shapes could be used, other than a triangle in rectangle. Furthermore, any number of the individual steps may be combined. In other words, while the various "steps" of determining the differences and conditions between monitors in a multi-monitor computer system may be performed individually, they may also be combined together according to implementation preferences.

Once a system has determined and stored the above-described factors that affect the visual appearance on information displayed across multi-monitor systems, a software application may advantageously use this information. However, while this information should be available, a software application designer must determine when and how such information should be used. To better illustrate when and how the above-determined values may be used, FIG. 11A is a pictorial diagram illustrating an exemplary display surface 200 upon which various graphical objects have been rendered, and FIG. 11B is a pictorial diagram illustrating the graphical objects of the display surface 200 of FIG. 11A on the exemplary multi-monitor computer system 100 in taking into account the various display differences between the monitors of the multi-monitor computer system.

Figure 11A:
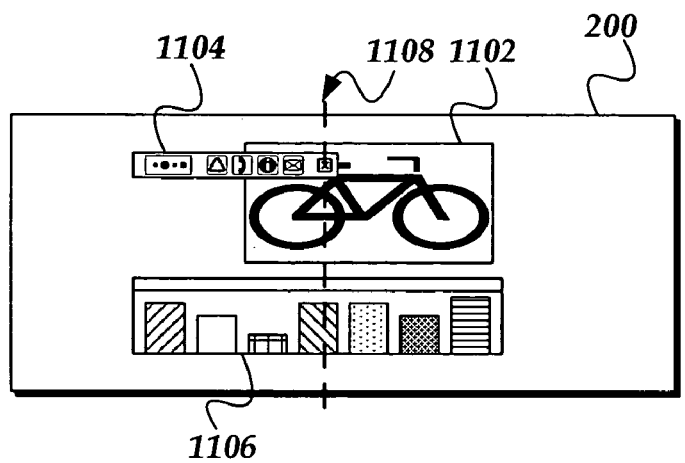
FIG. 11A is a pictorial diagram illustrating an exemplary display surface upon which various graphical objects been rendered.
Figure 11B:
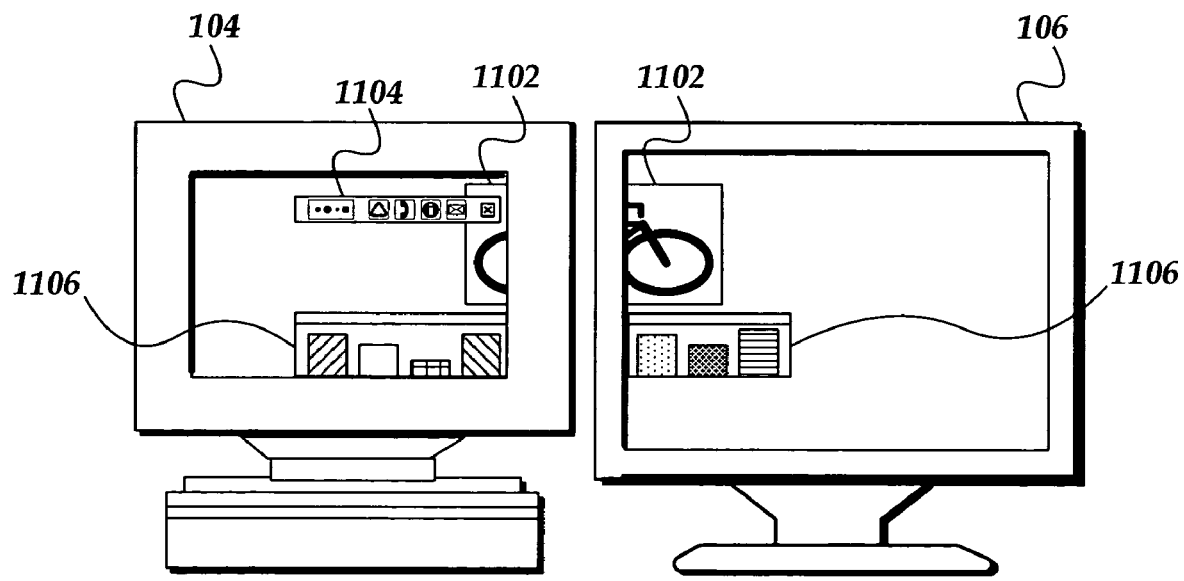
FIG. 11B is a pictorial diagram illustrating the graphical objects of FIG. 11A displayed on the exemplary multi-monitor computer system when taking into account the various display differences between the monitors of the multi-monitor computer system.

As illustrated in FIG. 11A, the exemplary display surface 200 includes three graphical items, including a graphical image 1102, a tool bar 1104, and a bar graph 1106. Clearly, if the entire display surface 200 corresponded to a single displayable area or monitor, the graphical items on the display surface 200 would appear as illustrated in FIG. 11A. However, in a multi-monitor computer system 100, the entire display surface 200 may not correspond to a single monitor. In this example, line 1108 identifies the division of the display surface 200 between the display areas for monitor 104 and monitor 106. As can be seen, line 1108 intersects each of the graphical items displayed on the display surface 200.

As mentioned above, FIG. 11B is a pictorial diagram illustrating the exemplary multi-monitor computer system 100 displaying the graphical items rendered on the display surface 200, as illustrated in FIG. 11A. As shown in FIG. 11B, the software application (or applications) that rendered the graphical items have taken advantage of the determined display differences in different manners. For example, with regard to the graphic image 1102, the application that rendered the graphic image has determined that visual contiguity is important, and accordingly, has displayed a substantial portion of the graphical image behind the occlusion area, which includes the physical separation between monitors 104 and 106 as well as the border surrounding each of the monitors. The software application has further rendered the graphical image 1102 such that the portion of the image falling on monitor 106 is similarly sized to that portion falling on monitor 104. Thus, graphical image 1102 appears to be visually correct and contiguous, though a substantial portion of the graphical image is hidden by the occlusion area.

In regard to the tool bar 1104, the software application may determine that it is to its best advantage to not display the tool bar across two monitors, but rather to render the tool bar 1104 wholly on one monitor or other. As illustrated in FIG. 11B, the software application has snapped the tool bar 1104 slightly to the left so that it remains entirely on monitor 104.

In regard to the bar graph 1106, the software application may determine that it is entirely acceptable to render the bar graph across monitors 104 and 106, and display each portion with similar proportions on the monitors. However, the software application may determine that it would be disadvantageous to permit some of the bar graph's 1106 information to be hidden behind the occlusion area, thus the bar graph is "broken apart" and displayed on the two monitors. Further, the software application may further determine that, while the bar graph 1106 may generally be displayed across monitors 104 and 106, it would not be advantageous to display half a bar on both monitors. Accordingly, the bar graph 1106 is broken up on both monitors such that the "break" occurs between bars in the bar graph, thus shifting the bar graph slightly to the left.

A memory may be one example of computer-readable media suitable for storing data that is ued to implement aspects of the disclosed subject matter. As used herein, the term "compter-readable media" includes volatile and non-volatile and removable and non-removable memory implemented in any method or technology capable of storing information, such as computer-readable instructions, data structures, program modules, or other data.

While various embodiments of the present invention have been illustrated and described, including the preferred embodiment, it will be appreciated that various changes can be made therein without departing from the spirit and scope of the invention.

The embodiments of the invention in which an exclusive property or privilege is claimed are defined as follows:

1. A method for determining display differences and separation between monitors in a multi-monitor display system, the method comprising:

displaying a first line across a first and second monitor, wherein a first segment of the first line is displayed on the first monitor and a second segment of the first line is displayed on the second monitor, and wherein one of the two segments of the first line is repositionable perpendicularly to the direction of the first line by a user, while a position of the first and second monitors remains fixed;

obtaining the aligned position of the repositionable segment of the first line after a user has repositioned the repositionable segment of the first line to be visually aligned in the direction of the other segment of the first line; and determining the physical alignment of the second monitor relative to the first monitor according to the difference of the aligned position of the repositionable segment of the first line from its initially displayed position.

2. The method of claim 1 further comprising:

displaying a second line across the first and second monitors, parallel to the first line, wherein a first segment of the second line is displayed on the first monitor and a second segment of the second line is displayed on the second monitor, and wherein one of the two segments of the second line is repositionable perpendicularly to the direction of the second line by a user;

obtaining the aligned position of the repositionable segment of the second line after a user has repositioned the repositionable segment of the second line to be visually aligned in the direction of the first segment of the second line; and determining the pixel resolution of the second monitor relative to the pixel resolution of the first monitor according to the difference of the aligned position of the repositionable segment of the second line from its initially displayed position.

3. The method of claim 2 further comprising:

displaying a third line across the first and second monitors, wherein a first segment of the third line is displayed on the first monitor and a second segment of the third line is displayed on the second monitor, and wherein one of the two segments of the third line is a rotatable segment, such that the rotatable segment rotates around an anchor point at the end of the rotatable segment that is closest to the other segment of the third line;

obtaining the rotation angle of the rotatable segment of the third line from its initially displayed direction after the user has rotated the rotatable segment of the third line such that the rotatable segment of the third line is parallel to the other segment of the third line; and determining the rotation of the second monitor relative to the first monitor according to the rotation angle.

4. The method of claim 3, wherein displaying the third line, obtaining the rotation angle of the rotatable segment of the third line after the user has rotated the rotatable segment of the third line, and determining the rotation of the second monitor relative to the first monitor is performed prior to displaying the first line.

5. The method of claim 3 further comprising, as the user repositions the repositionable segment of the second line, repeatedly:

obtaining the current position of the repositionable segment of the second line;

determining the pixel resolution of the second monitor relative to the pixel resolution of the first monitor according to the difference of the current position of the repositionable segment of the second line from its initially displayed position; and displaying the repositionable segment of the second line with a line thickness corresponding to the line thickness of the other segment of the second line according to the determined pixel resolution of the monitor upon which the repositionable segment of the second line is displayed relative to the pixel resolution of the other monitor.

6. The method of claim 3 further comprising storing the determined values as operating system values such that they are available to applications running on the host operating system running on the multi-monitor display system.

7. The method of claim 6, wherein determining the display differences between monitors in the multi-monitor display system is performed as part of the host operating system's setup process.

8. The method of claim 7, wherein determining the display differences between monitors in the multi-monitor display system is performed as a monitor is added to the mult-monitor display system.

9. A method for determining display differences and separation between monitors in a multi-monitor display system, the method comprising:

displaying a first line across a first and second monitor, wherein a first segment of the first line is displayed on the first monitor and a second segment of the first line is displayed on the second monitor, and wherein one of the two segments of the first line is repositionable perpendicularly to the direction of the first line by a user, while a position of the first and second monitors remains fixed;

obtaining the aligned position of the repositionable segment of the first line after a user has repositioned the repositionable segment of the first line to be visually aligned in the direction of the other segment of the first line;

determining the physical alignment of the second monitor relative to the first monitor according to the difference of the aligned position of the repositionable segment of the first line from its initially displayed position;

displaying a second line across the first and second monitors, parallel to the first line, wherein a first segment of the second line is displayed on the first monitor and a second segment of the second line is displayed on the second monitor, and wherein one of the two segments of the second line is repositionable perpendicularly to the direction of the second line by a user;

obtaining the aligned position of the repositionable segment of the second line after a user has repositioned the repositionable segment of the second line to be visually aligned in the direction of the first segment of the second line; and determining the pixel resolution of the second monitor relative to the pixel resolution of the first monitor according to the difference of the aligned position of the repositionable segment of the second line from its initially displayed position.

10. A computer system that determines display differences and separation between multiple monitors on the system, comprising:

a first monitor for displaying information from a computing device; and a computing device, coupled to the first monitor for displaying information, and configured such that, upon adding a second monitor to the computer system, the computing device:

displays a first line across the first and second monitors, wherein a first segment of the first line is displayed on the first monitor and a second segment of the first line is displayed on the second monitor, and wherein one of the two segments of the first line is repositionable perpendicularly to the direction of the first line by a user, while a position of the first and second monitors remains fixed;

obtains the aligned position of the repositionable segment of the first line after the user has repositioned the repositionable segment of the first line to be visually aligned in the direction of the other segment of the first line; and determines the physical alignment of the second monitor relative to the first monitor according to the difference of the aligned position of the repositionable segment of the first line from its initially displayed position.

11. The computer system of claim 10, wherein, upon adding the second monitor to the computer system, the computer system is further configured to:

display a second line across the first and second monitors, parallel to the first line, wherein a first segment of the second line is displayed on the first monitor and a second segment of the second line is displayed on the second monitor, and wherein one of the two segments of the second line is repositionable perpendicularly to the direction of the second line by a user;

obtain the aligned position of the repositionable segment of the second line after a user has repositioned the repositionable segment of the second line to be visually aligned in the direction of the first segment of the second line; and determine the pixel resolution of the second monitor relative to the pixel resolution of the first monitor according to the difference of the aligned position of the repositionable segment of the second line from its initially displayed position.

12. The computer system of claim 11, wherein, upon adding the second monitor to the computer system, the computer system is further configured to:

display a third line across the first and second monitors, wherein a first segment of the third line is displayed on the first monitor and a second segment of the third line is displayed on the second monitor, and wherein one of the two segments of the third line is a rotatable segment, such that the rotatable segment rotates around an anchor point at the end of the rotatable segment that is closest to the other segment of the third line;

obtain the rotation angle of the rotatable segment of the third line from its initially displayed direction after the user has rotated the rotatable segment of the third line such that the rotatable segment of the third line is parallel to the other segment of the third line; and determine the rotation of the second monitor relative to the first monitor according to the rotation angle.

13. The computer system of claim 12, wherein the third line is displayed, the rotation angle of the rotatable segment of the third line is obtained after the user has rotated the rotatable segment of the third line, and the rotation of the second monitor relative to the first monitor is determined before the first line is displayed.

14. The computer system of claim 12, wherein as the user repositions the repositionable segment of the second line, the computer system is further configured to repeatedly:

obtain the current position of the repositionable segment of the second line;

determine the pixel resolution of the second monitor relative to the pixel resolution of the first monitor according to the difference of the current position of the repositionable segment of the second line from its initially displayed position; and display the repositionable segment of the second line with a line thickness corresponding to the line thickness of the other segment of the second line according to the determined pixel resolution of the monitor upon which the repositionable segment of the second line is displayed relative to the pixel resolution of the other monitor.

15. The computer system of claim 12, wherein the computer system is further configured to store the determined values as operating system values of the computer system's host operating system such that they are available to applications running on the host operating system.

16. The computer system of claim 15, wherein the computer system determines the display differences between monitors in the multi-monitor display system as part of the host operating systems setup process.

17. A computer system that determines display differences and separation between multiple monitors on the system, comprising:

a first monitor for displaying information from a computing device; and a computing device, coupled to the first monitor for displaying information, and configured such that, upon adding a second monitor to the computer system, the computing device:

displays a first line across the first and second monitors, wherein a first segment of the first line is displayed on the first monitor and a second segment of the first line is displayed on the second monitor, and wherein one of the two segments of the first line is a rotatable segment, such that the rotatable segment rotates around an anchor point at the end of the rotatable segment that is closest to the other segment of the first line, while a position of the first and second monitors remains fixed;

obtains the rotation angle of the rotatable segment of the first line from its initially displayed direction after the user has rotated the rotatable segment of the first line such that the rotatable segment of the first line is parallel to the other segment of the first line;

determines the rotation of the second monitor relative to the first monitor according to the rotation angle;

displays a second line across the first and second monitors, wherein a first segment of the second line is displayed on the first monitor and a second segment of the second line is displayed on the second monitor, and wherein one of the two segments of the second line is repositionable perpendicularly to the direction of the second line by a user;

obtains the aligned position of the repositionable segment of the second line after the user has repositioned the repositionable segment of the second line to be visually aligned in the direction of the other segment of the second line; and determines the physical alignment of the second monitor relative to the first monitor according to the difference of the aligned position of the repositionable segment of the second line from its initially displayed position;

displays a third line across the first and second monitors, parallel to the second line, wherein a first segment of the third line is displayed on the first monitor and a second segment of the third line is displayed on the second monitor, and wherein one of the two segments of the third line is repositionable perpendicularly to the direction of the third line by a user;

obtains the aligned position of the repositionable segment of the third line after a user has repositioned the repositionable segment of the third line to be visually aligned in the direction of the first segment of the third line; and determines the pixel resolution of the second monitor relative to the pixel resolution of the first monitor according to the difference of the aligned position of the repositionable segment of the third line from its initially displayed position.

18. A computer-readable medium bearing computer-executable instructions which, when executed on a multi-monitor computer system, carry out a method for determining display differences between the monitors of the multi-monitor display system, the method comprising:

displaying a first line across a first and second monitor, wherein a first segment of the first line is displayed on the first monitor and a second segment of the first line is displayed on the second monitor, and wherein one of the two segments of the first line is repositionable perpendicularly to the direction of the first line by a user, while a position of the first and second monitors remains fixed;

obtaining the aligned position of the repositionable segment of the first line after a user has repositioned the repositionable segment of the first line to be visually aligned in the direction of the other segment of the first line;

determining the physical alignment of the second monitor relative to the first monitor according to the difference of the aligned position of the repositionable segment of the first line from its initially displayed position;

displaying a second line across the first and second monitors, parallel to the first line, wherein a first segment of the second line is displayed on the first monitor and a second segment of the second line is displayed on the second monitor, and wherein one of the two segments of the second line is repositionable perpendicularly to the direction of the second line by a user;

obtaining the aligned position of the repositionable segment of the second line after a user has repositioned the repositionable segment of the second line to be visually aligned in the direction of the first segment of the second line; and determining the pixel resolution of the second monitor relative to the pixel resolution of the first monitor according to the difference of the aligned position of the repositionable segment of the second line from its initially displayed position.

* * * * *